(12) United States Patent
Valencia (10) Patent No.: US 6,650,652 B1
(45) Date of Patent: Nov. 18, 2003

(54) OPTIMIZING QUEUING OF VOICE PACKET FLOWS IN A NETWORK

(75) Inventor: Andrew Valencia, Vashon, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,430

(22) Filed: Oct. 12, 1999

(51) Int. Cl.[7] .................................................. H04J 3/17
(52) U.S. Cl. ...................................... 370/433; 370/352
(58) Field of Search ................................ 370/352, 473, 370/474, 470, 471, 433–435, 522, 528

(56) References Cited

U.S. PATENT DOCUMENTS

| | | | |
|---|---|---|---|
| 5,659,541 A | 8/1997 | Chan | 370/236 |
| 5,870,397 A | * 2/1999 | Chauffour et al. | 370/435 |
| 5,892,753 A | * 4/1999 | Badt et al. | 370/233 |
| 5,963,551 A | 10/1999 | Minko | 370/356 |
| 6,131,121 A | 10/2000 | Mattaway et al. | 709/227 |
| 6,141,324 A | 10/2000 | Abbott et al. | 370/236 |
| 6,201,562 B1 | 3/2001 | Lor | 348/14.01 |
| 6,205,156 B1 | * 3/2001 | Watanabe et al. | 370/474 |
| 6,226,678 B1 | 5/2001 | Mattaway et al. | 709/230 |
| 6,259,691 B1 | * 7/2001 | Naudus | 370/352 |
| 6,304,574 B1 | * 10/2001 | Schoo et al. | 370/356 |
| 6,370,125 B1 | 4/2002 | Belk | 370/312 |
| 6,430,196 B1 | * 8/2002 | Baroudi | 370/474 |
| 6,487,200 B1 | * 11/2002 | Fraser | 370/356 |
| 6,490,556 B1 | * 12/2002 | Graumann et al. | 704/233 |

* cited by examiner

Primary Examiner—Chau Nguyen
Assistant Examiner—Keith M. George
(74) Attorney, Agent, or Firm—Baker Botts L.L.P.

(57) ABSTRACT

A system and method are disclosed for increasing the efficiency with which data is transmitted over a network link. Voice packets are encoded to include header bits that indicate the presence and duration of pauses in the voice transmission. A Network linking device monitors incoming voice packets on a link, checking for the presence of a pause. The linking device also keeps track of all voice connections on the link. When none of the voice connections are active, the linking device increases the size of the maximum allowed transferable unit (MATU), thus fragmenting less data packets than it would have fragmented if a voice connection had been active. Fragmentation is reduced while maintaining sound quality.

45 Claims, 5 Drawing Sheets

OPTIMIZING QUEUING OF VOICE PACKET FLOWS IN A NETWORK

FIELD OF THE INVENTION

The present invention relates to computer networks, and more particularly to the transmission of data over such networks.

BACKGROUND OF THE INVENTION

With the proliferation of data networks such as the Internet, there is a growing demand to transmit real-time voice and audio-visual signals over such networks. However, transmission of real-time voice and audio-visual signals is not a simple task, since most data networks were not designed to handle this type of traffic.

Perhaps the biggest impediment to the efficient transmission of high-quality real-time voice data is voice data's strict latency requirements. It has been found, for example, that if voice packets are delayed even by as little as 200 ms, the quality of the voice signal is significantly degraded. If a large temporal gap appears in the middle of a word or phrase, the listener may not be able to understand what is being said, and, in any event, will probably soon become annoyed or fatigued. Thus, to meet the latency requirements of voice data, Internet Protocol (IP) networks typically employ a connectionless protocol such as the User Datagram Protocol (UDP) to send voice signals, rather the Transmission Control Protocol (TCP) commonly used to transmit other types of data signals. UDP provides higher throughput and lower latency than TCP, but offers these benefits at the expense of data integrity.

While data networks can, through the use of protocols such as UDP, improve the quality of voice transmissions, problems still arise when excessive traffic on the network causes network congestion, since data networks do not naturally handle congestion in a manner conducive to the effective transmission of real-time data. Network links will often be called upon to handle multiple flows of data (a flow of data includes packets traveling from one source to one destination) simultaneously, and thus will typically queue the packets they receive before sending them on to the appropriate destination. The queuing mechanisms commonly employed in such networks are typically not sensitive to the latency requirements of real-time data, and thus are prone to producing unacceptable levels of delay or jitter in the real-time signal.

For example, a typical network queue is called upon to handle data packets of varying sizes, and some of the data packets are, for efficiency reasons, relatively large. However, these large data packets can cause degradation of voice signals being transmitted through the same queue, since the voice packets are slowed if they must wait for the link to transfer the large data packets. This problem cannot be solved by simply giving voice packets priority over large data packets in the queue because such a scheme could effectively trap the large data packets in the queue, thus unacceptably interfering with their transmission. Moreover, even if voice packets were given the highest priority in the queue, they could still experience unacceptable delays if they were to arrive in the queue just as a large data packet was beginning to be transmitted, since they would have to wait for the transmission of the large data packet to finish before they could be transmitted.

One way to reduce these problems is to fragment large data packets into smaller, more manageable packets. Fragmentation is undesirable, however, as it reduces network efficiency by increasing the amount of data headers that must be transmitted, thus increasing network bandwidth requirements and slowing transmission of data. Packets typically consist of a fixed-length header containing protocol and routing information and a variable-length payload containing the actual data that is to be communicated. Fragmentation breaks up the payloads of large packets, creating two or more smaller packets, each having its own header. As a result, fragmentation decreases the efficiency of transmitting the information contained in the original, large payloads by reducing the size of the payload relative to the size of the header.

Moreover, the strict latency requirements of real time signals such as voice often dictate a relatively high degree of fragmentation. For example, while a data network may be able to support a maximum transmission unit (MTU) of 1500 bytes, a voice signal will often require a much smaller maximum allowed transferable unit (MATU) so that latency is reduced. For example a MATU of no greater than 256 bytes may be required. The distinction between the MTU and the MATU is that the MTU is set for a network and does not change depending on the traffic on the network. When a type of traffic is carried by the network with a strict latency requirement, the network may be further constrained to transfer units that are smaller than a MTU. The MATU is smaller than the MTU and changes depending on the type of traffic carried by the network.

In addition, since many routers are unable to detect the presence or absence of voice data, if a data network is used to transmit voice data, the routers in the network typically need to be set to fragment every large packet they receive, regardless of whether any voice signals are active.

In sum, while it is possible to send latency-sensitive signals over a data network, doing so using prior art fragmentation techniques can compromise the overall efficiency of the network. What is needed is a way to control the fragmentation of packets so that the latency requirements of real time data, such as voice, are met without unnecessarily compromising network efficiency.

SUMMARY OF THE INVENTION

Accordingly, a system and method are disclosed for increasing the efficiency with which data is transmitted over a network link. In one embodiment, voice packets are encoded to include header bits that indicate the presence and duration of pauses in the voice transmission. A Network linking device monitors incoming voice packets on a link, checking for the presence of a pause. The linking device also keeps track of all voice connections on the link. When none of the voice connections are active, the linking device increases the size of the maximum allowed transferable unit (MATU), thus fragmenting less data packets than it would have fragmented if a voice connection had been active. Fragmentation is reduced while maintaining sound quality.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a system for receiving and transmitting packets in a network, includes a receiver operable to receive a plurality of flows of packets from a plurality of sources. A transmitter is operable to transmit the plurality of flows of packets to one or more destinations. A detector is operable to detect a pause in a signal embodied in a particular flow of packets. a processor is operable to cause a modification to the manner in which packets are transmitted if the detector detects a pause in the signal embodied in the particular flow of packets.

In one embodiment, a method of transmitting a flow of data over a network, includes packaging the flow of data into a plurality of packets. A pause is detected in the flow of data. A marker is recorded that is indicative of the pause in a packet. The marker is operable to cause a downstream link to increase the size of a maximum allowed transferable unit for the link.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims, and the invention encompasses numerous alternatives, modifications, and equivalents. For example, while the description appearing below is in the context of a system for transmitting voice data over IP networks, such as the Internet, those skilled in the art will recognize that the disclosed systems and methods are readily adaptable for broader application. For example, the systems and methods described below could be used to transmit data other than voice, such as video or audio-visual data, and could be used on networks other than IP networks, such as ATM or frame relay networks.

Moreover, while numerous details are set forth in the following description in order to provide a thorough understanding of the present invention, some details relating to technical material that is known in the technical fields related to the invention have not been described in depth in order to avoid unnecessarily obscuring the present invention. It should be understood that the present invention might be practiced according to the claims without some or all of these details.

The disclosed systems and methods take advantage of the pauses that occur in voice transmissions to increase the efficiency with which data is transmitted over a network link. One or more network links may be included in various network devices including routers, bridges, or PC's. Any network device that includes a link is referred to herein as a linking device. A linking device may include multiple network interfaces connected to different links. In general, the techniques disclosed herein may be implemented independently for each link. That is, each link to a particular network linking device may have its own state and a MATU may be determined by the linking device for each link based on the state of the link. Voice packets are preferably encoded to include header bits that indicate the presence and duration of pauses in the voice transmission. Network linking devices monitor incoming voice packets for each link, checking for the presence of a pause. Each linking device also keeps track of all voice connections for each link. When none of the voice connections are active—e.g., all are paused or terminated—the linking device stops fragmenting packets to a size less than the MTU for the purpose of maintaining sound quality. Thus, fewer data packets are fragmented than would have been fragmented if a voice connection had been active. In this manner, fragmentation is reduced while maintaining sound quality.

Figure 1:
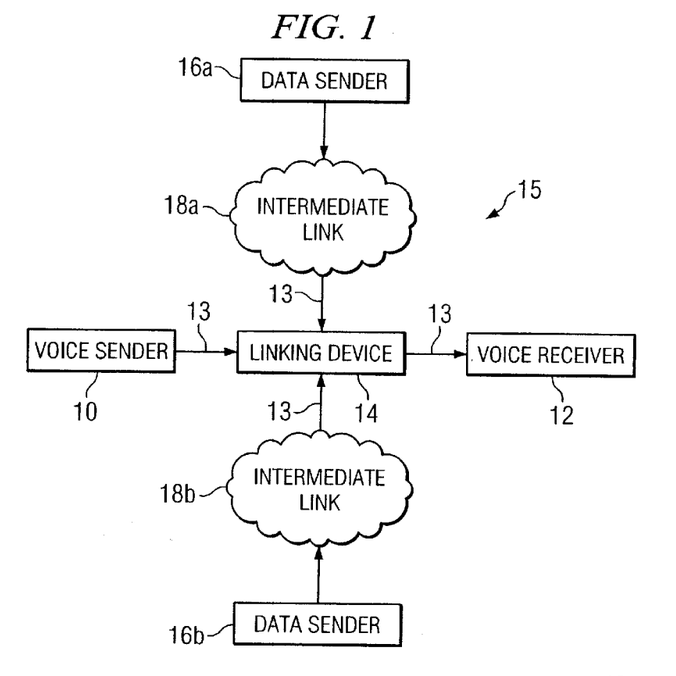
FIG. 1 is an illustration of a system for sending and receiving signals according to an embodiment of the present invention.

FIG. 1 is a block diagram of a system for practicing an embodiment of the present invention. As shown in FIG. 1, a sender 10 transmits voice data to a receiver 12 via linking device 14. One or more additional data senders 16a and 16b may also be connected to linking device 14. Collectively, sender 10, receiver 12, linking device 14, and a plurality of additional data senders, receivers, and linking devices comprise a network 15.

Sender 10 is preferably operable to obtain a voice signal and to convert the voice signal into digital form. Thus, sender 10 may include a microphone for obtaining a voice signal and a digital signal processor or codec for converting the analog voice signal into digital form. In one embodiment, the voice signal is encoded using a pulse code modulation (PCM) technique, although it will be appreciated that for purposes of practicing the present invention, other suitable encoding techniques could be used instead, including without limitation, differential pulse code modulation, adaptive differential pulse code modulation, delta modulation, or predictive encoding. Sender 10 is also preferably operable to package or "packetize" the digital voice signal into packets for transmission over network 15. Sender 10 may also be configured to compress the voice signal prior to and/or after packetization. Correspondingly, receiver 12 is preferably operable to receive packets from network 15 and to reconstruct the original voice signal. It should be appreciated, however, that for purposes of practicing the present invention, sender 10 and receiver 12 need not be operable to perform each of the foregoing functions.

Linking device 14 is configured to receive flows of data from a plurality of sources and to forward these data flows to their appropriate destinations. Although FIG. 1 shows linking device 14 connected to sender 10 and receiver 12, it will be appreciated that for purposes of practicing the present invention either or both of sender 10 and receiver 12 could be connected to linking device 14 via a series of one or more intermediate links 18*a*–*b* operable to facilitate communications to and from linking device 14.

As shown in FIG. 1, senders 10 and 16*a* and 16*b* and receiver 12 are connected to linking device 14 by connections 13. For purposes of practicing the present invention, it should be appreciated that connections 13 may comprise any suitable connection media. For example, the elements shown in FIG. 1 may communicate over communications channels that are leased from common carriers (e.g. telephone companies) or are provided by the owners of the network 15 or one or more sub-networks thereof. Connections 13 may comprise a variety of transmission media, including without limitation, optical fibers, coaxial cable, twisted copper pairs, satellite links, digital microwave radio, or any suitable combination thereof. Moreover, the links and elements of network 15, or the sub-networks thereof, may be distributed over a wide area spanning hundreds or thousands of miles or over local areas ranging from less than a few feet to several miles, in which case the networks are called wide area networks (WAN) or local area networks (LAN), respectively. Combinations of LANs and WANs are also possible. For example, widely separated LANs in branch offices could be connected via a WAN to the LAN in a corporate headquarters.

Figure 2A:
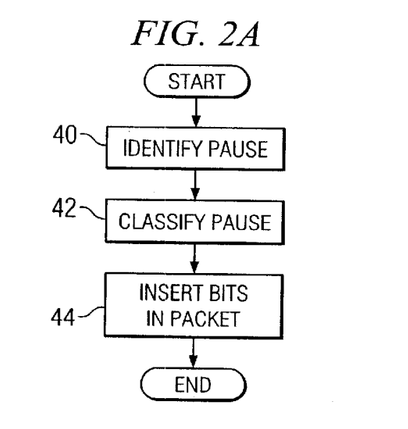
FIG. 2A is a diagram illustrating the process of sending a voice signal in one embodiment of the present invention.

Referring to FIG. 2A, the operation of sender 10 according to one embodiment of the present invention is illustrated in more detail. In this embodiment, sender 10 is configured to identify pauses in the voice input being sampled, and to record information indicative of these pauses in the packets it transmits to linking device 14. As the sender encodes voice or other data, it checks for the presence of a pause (40). Any suitable pause detection algorithm could be used in accordance with the principles of the present invention. For example, many encoders currently include the capability of suppressing silence when encoding voice signals for transmission. Accordingly, if sender 10 includes a silence suppression capability, sender 10 may be configured to utilize the information generated by the silence suppression circuitry or logic to identify pauses in the voice data and, if desired, the approximate duration of these pauses.

Having identified a pause, sender 10 preferably classifies the pause according to certain predefined criteria (42). For example, sender 10 may determine whether the pause is an inter-word pause, an inter-sentence pause, or a longer pause by examining the context of the surrounding data packets or by timing or otherwise determining the length of the pause.

In one embodiment, a pause comprises any gap in a data flow that exceeds a predefined limit, for example, 0.03 ms. Pauses that are shorter than the predefined limit are ignored. An appropriate predefined limit for a particular application is determined based on factors such as the amount of delay or jitter that is tolerable for that application. Any limit may be used that is determined in a suitable manner, whether manually, automatically, or according to default physical principles.

In another embodiment, pauses are grouped into three categories. The first category includes pauses that are longer than a first predefined limit, and shorter than a second predefined limit. The second category includes pauses that are longer than the second predefined limit, but shorter than a third predefined limit. The third category of pauses are those that are longer than the third predefined limit. It should be understood that the present invention may be practiced using more (or less) categories of pauses, and that the predefined thresholds may be set at any suitable levels.

Once a pause has been detected and classified, the sender then preferably inserts or alters bits in the header of the packet containing the last voice data before the pause (44). These bits indicate the presence of and, in some embodiments, the duration or classification of the pause as determined in the previous steps. For example, in an embodiment that uses UDP/IP packets, bits may be appropriately added to, or modified within, the real-time protocol (RTP) header, or extended RTP header, to contain information regarding the presence of a pause.

Figure 2B:
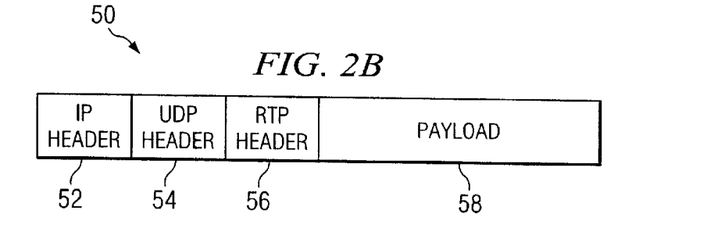
FIG. 2B is an illustration of a typical voice packet in one embodiment of the present invention.

FIG. 2B is an illustration of a typical voice packet 50 according to one embodiment of the present invention. In this embodiment, voice packet 50 includes an IP header 52, a UDP header 54, an RTP header 56, and a payload 58. Headers 52, 54, and 56 include routing and other protocol information, while payload 58 comprises encoded voice data. As stated previously, information indicative of the presence and/or duration of a pause is preferably inserted in the RTP header. For example, this can be accomplished by use of an extended RTP header, wherein the additional bits of the header are reserved for information regarding pauses, or by reserving bits in a standard RTP header for this information.

In one embodiment, a single bit is used to designate the presence or absence of a pause. If the bit is set to 1, then there is a pause in the voice stream. If the bit is set to 0, then there is no pause. Similarly, in another embodiment, two bits are used to indicate the presence and the duration of a pause. In this embodiment the four possible states of the two bits are used to indicate whether there is a pause (e.g., by setting both bits to 0 if there is no pause), and if there is a pause, the duration of the pause (e.g., by setting the bits to 01, 10, or 11 depending on its duration). In other embodiments, other methods of storing pause information in a packet are used.

Moreover, one of ordinary skill in the art will recognize that FIG. 2B is an illustration of but one embodiment of the present invention, and that other suitable packet formats could be used without departing from the principles of the present invention. For example, a frame relay packet or frame could be used instead of packet 50, as could an asynchronous transfer mode (ATM) packet or cell.

Similarly, while in one embodiment information regarding a pause in a voice or data stream is inserted into a packet's header, it will be appreciated that this information could be conveyed to linking device 14 in a variety of different ways without departing from the principles of the present invention. For example, this information could be placed at any conveniently-accessed location in a packet or elsewhere in a flow of data; or, as described in more detail below, this information may not be included in the packets at all. Instead, the information may be derived instead from characteristics of the packet flow itself, such as the frequency with which linking device 14 receives packets from the flow.

Figure 3A:
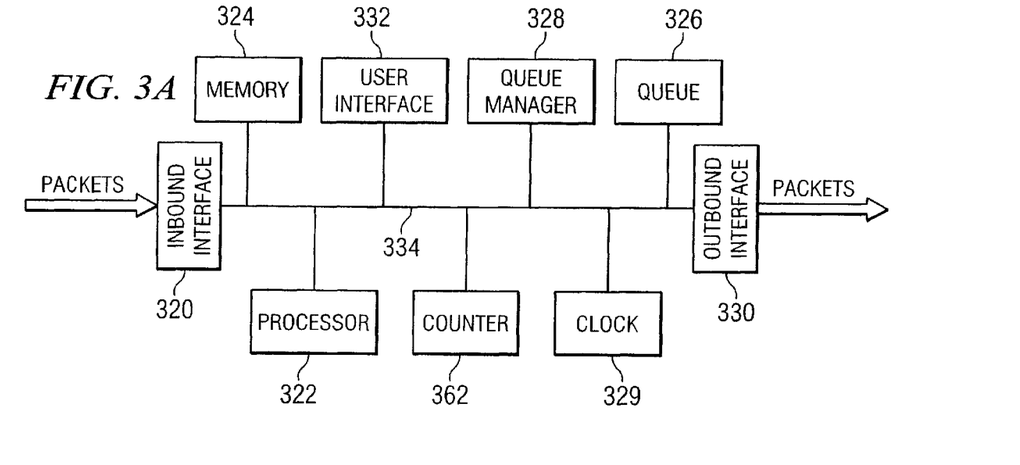
FIG. 3A is an illustration of a linking device in one embodiment of the present invention.

FIG. 3A is a more detailed block diagram of linking device 14. In this embodiment linking device 14 preferably includes:

- an inbound interface 320 for receiving incoming packets;
- a processor 322 for processing the incoming packets and preparing them for forwarding;
- a memory unit 324 for storing control programs and information regarding the flow of packets through the links connected to linking device 14;
- a queue 326 for temporarily storing packets that are ready to be retransmitted;
- a queue manager 328 for controlling the movement of packets into and out of each queue for each link, and for monitoring the flow of packets on each link;

a system clock 329;

a counter 362;

an outbound interface 330 for transmitting packets to a receiver;

a user interface 332, including a display and one or more input devices (not shown), with which a link manager can monitor, maintain, and provide commands to linking device 14; and one or more buses 334 for interconnecting the aforementioned elements.

It should be understood that the block diagram shown in FIG. 3A is for purposes of illustration, and that the invention could be practiced with linking devices having a different physical or logical structure. For example, queue manager 328 may simply comprise processor 322 operating in conjunction with control circuitry or software contained in memory 324. As another example, in one embodiment queue 326 could be implemented in memory unit 324, while in another embodiment queue 326 could be implemented as a separate element, for example, a memory buffer circuit. In yet another embodiment, multiple output and/or input queues are used. Thus some of the elements shown in FIG. 3A can be omitted or combined with other elements without departing from the principles of the present invention.

Referring once again to FIG. 3A, memory unit 324 preferably includes a combination of volatile fast-access memory, such as random access memory (RAM), and non-volatile memory, such as read-only memory (ROM), flash memory and/or magnetic disk storage. In addition, and as described in more detail below, memory unit 324 preferably contains software which, in conjunction with processor 322, controls the operation of linking device 14.

Figure 3B:
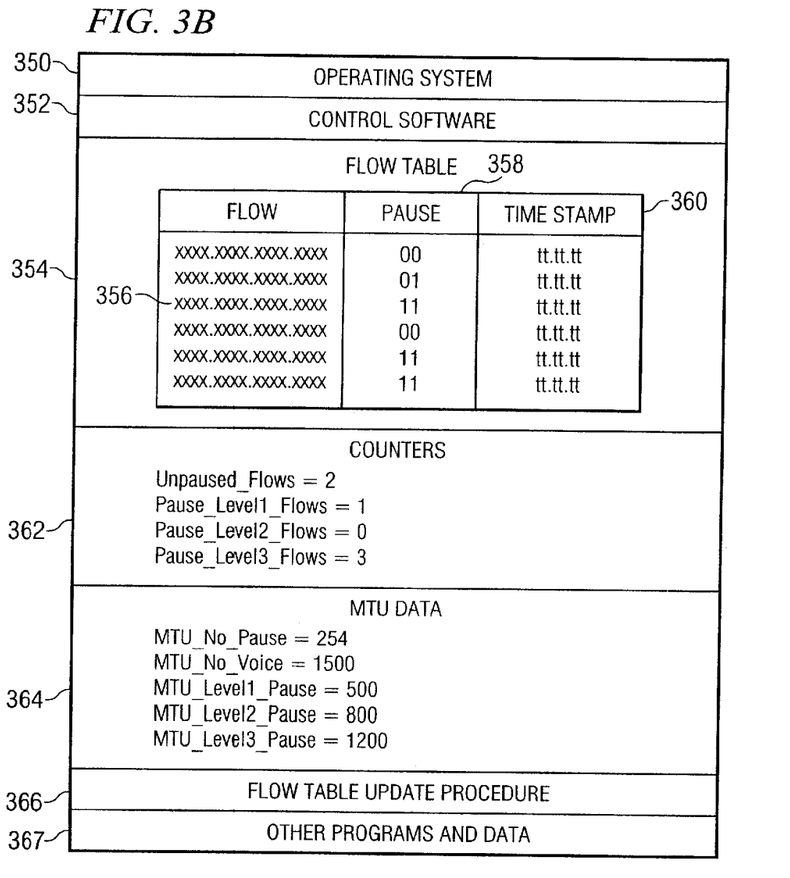
FIG. 3B is an illustration of the contents of a link memory unit in accordance with an embodiment of the present invention.

FIG. 3B is an illustration of the contents of memory 324 in one embodiment of the present invention. As shown in FIG. 3B, memory 324 preferably includes an operating system 350 and control software 352 for managing the operation of linking device 14. For example, control software may contain instructions for receiving, monitoring, analyzing, fragmenting, queuing, and transmitting packets.

In addition, memory 324 preferably includes a flow table 354 for storing information regarding the flows of data passing through linking device 14. As shown in FIG. 3B, in one embodiment, flow table 354 includes a flow identifier 356 for each flow of voice data passing through linking device 14, as well as a pause-type identifier 358, indicating the presence and/or duration of a pause associated with each flow, and a time-stamp 360 indicating the last time a packet from each flow was received by linking device 14.

In the embodiment shown in FIG. 3B, the flows in flow table 354 are from an IP network and each flow is identified by the source and destination IP addresses and ports of packets in the flow. In another embodiment, each flow is identified by applying an appropriate hash function to its IP quad. In other embodiments, other suitable flow identifiers are used. Similarly, while the pause-type identifier may simply consist of a copy of the bits contained in the header of one of the packets in the flow, other suitable pause indicators may be chosen in accordance with the principles of the present invention. Thus, flow table 354 can contain more (or less) information than shown in FIG. 3B without departing from the principles of the present invention. For example, flow table 354 may contain information regarding each flow of voice or other data passing through linking device 14, and may contain fields in addition to those shown in FIG. 3B. In one embodiment, information regarding whether a flow is paused is not stored in the individual flow packets. Instead, linking device 14 simply scans flow table 354 at regular intervals and determines whether a given flow is paused or terminated by examining the time stamp of the last packet received from this flow. If the time stamp is older than a predetermined amount, then the flow is deemed to be paused, and the state, or MATU, of the link corresponding to the flow is updated accordingly. Accordingly, in this embodiment flow table 354 may be implemented without including a pause-type identifier field.

Referring once again to FIG. 3B, memory unit 324 may also include one or more counter variables 362 for keeping track of the number of active voice connections passing through linking device 14 for each link, and/or the number of voice connections of a particular pause type. Memory 324 also preferably includes data regarding the MATU 364 for different conditions, specifying the maximum allowable packet size that link 14 will transmit without fragmentation. For example, in one embodiment, memory 324 contains the MATU for each possible state of each link. Thus, memory 324 contains information regarding the MATU to be used if no voice flows are active, the MATU to be used if one or more unpaused voice flows are active, and the MATUs to be used with voice flows having different pause lengths.

Figure 3C:
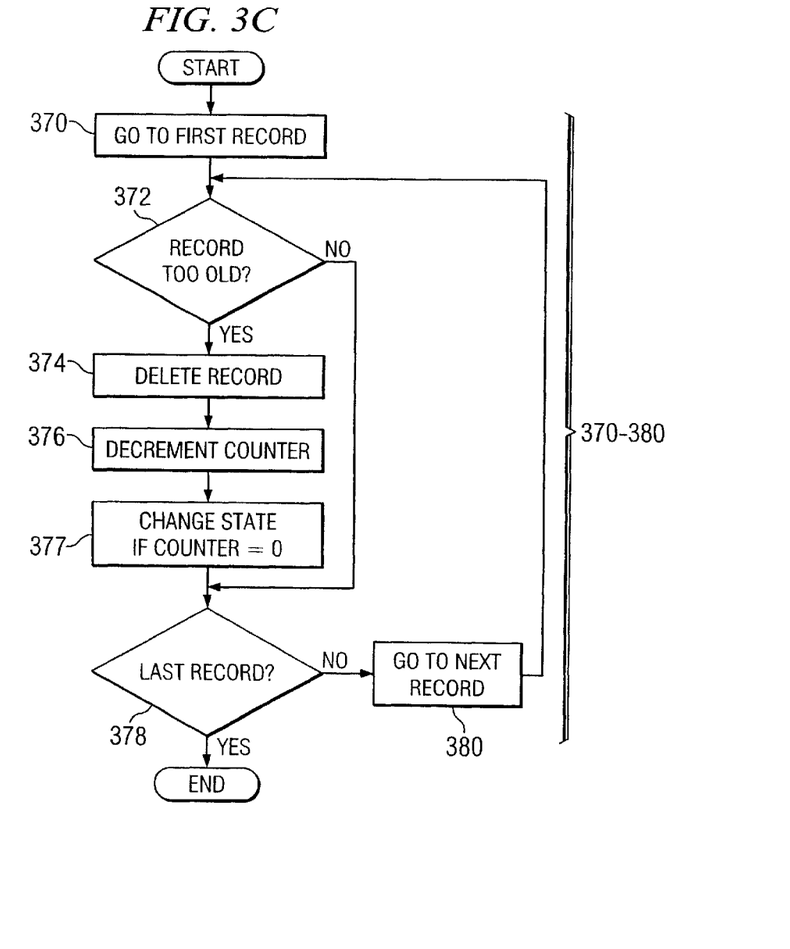
FIG. 3C is an illustration of a procedure for maintaining a table of flow information in accordance with an embodiment of the present invention.

Memory 324 also preferably includes a procedure for maintaining flow table 354. An exemplary implementation of this procedure is shown in FIG. 3C. This procedure is preferably executed at predetermined intervals by processor 322 and is operable to cycle through the records in flow table 354 (370–380), deleting those records having a time stamp that is older than a predetermined amount (372, 374). The predetermined amount could be readily chosen by considering factors such as the amount of memory allocated to the flow table 324, the period of the clock used to apply the time stamp, the level of congestion on the link, the frequency with which maintenance procedure 366 is executed, and/or any other suitable factors. If a record is removed from flow table 354, this procedure is also operable to decrement the appropriate counters 362 corresponding to the type of record (376). If a counter is decremented to zero, procedure 366 is also operable to cause the link to change state, updating its current MATU and any other necessary variables as appropriate.

Figure 4:
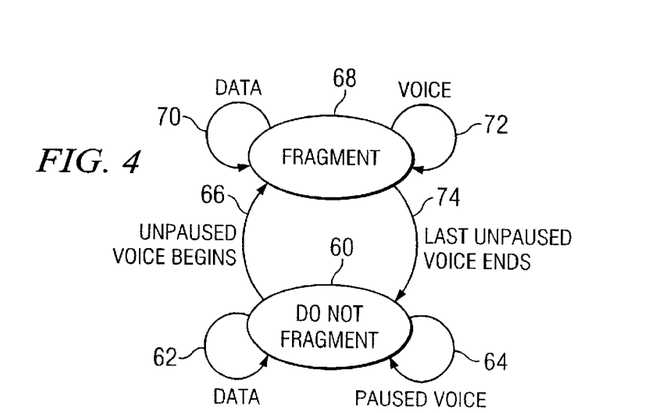
FIG. 4 is an exemplary state diagram describing the operation of a link according to an embodiment of the present invention.

FIG. 4 is an exemplary state diagram illustrating the operation of a link in accordance with an embodiment of the present invention. As discussed previously, linking device 14 is operable to receive packets from one or more sources and to send them to one or more destinations, such as receiver 12 or other intermediate linking devices. When linking device 14 receives a packet on a link, it determines whether the packet needs to be fragmented, preferably by comparing the size of the packet against a predetermined metric, such as the MATU of the link. If the packet is larger than the appropriate MATU, then link 14 will fragment the packet. If the packet is smaller than (or the same size as) the MATU, then link 14 will not fragment the packet.

If no latency-sensitive data flows such as voice data flows are active on the link, the linking device will typically not fragment incoming packets, as most packets received on the link will be less than or equal to the MTU of network 15. Thus, it is convenient to characterize this default state as one in which fragmentation does not occur, although it will be understood that if, for example, the link were to receive a packet that exceeded the MTU of network 15, this packet would be fragmented. If, however, a flow of latency-sensitive data is active on the link, then the MATU of the link will be decreased, and packets will be fragmented that would otherwise have been transmitted without fragmentation.

These principles are illustrated in FIG. 4, which is a state diagram of a link in one embodiment of the present invention. Referring to FIG. 4, two states are shown: one which fragments packets greater than a predetermined size, and one which does not (states 68 and 60, respectively). As described above, the state in which the link resides depends on whether a flow of latency-sensitive packets, such as UDP voice packets, are in the process of being transmitted over the link.

Thus, with reference to FIG. 4, the default state of the link is to send packets without fragmentation (state 60). If, while in this state, a packet is received (62), the link simply transmits the packet without fragmentation. Similarly, if a latency-sensitive packet such as a UDP voice packet is received, but the header of this packet indicates that the voice flow is paused, the link will remain in state 60, and will continue to transmit subsequently-received packets without fragmentation (64).

However, if a latency-sensitive packet is received, and the header of this packet indicates that the corresponding flow is not paused, then the link transitions to state 68, wherein the default packet transmission procedure is to fragment incoming packets (potentially including other latency-sensitive packets) that are greater than a predefined size. Thus, if a packet is subsequently received, linking device 14 fragments it if it is greater than the MATU of this state (70). Similarly, as long as at least one latency-sensitive flow of packets is active and not paused, the link remains in state 68 regardless of whether the packets from other latency-sensitive packet flows indicate that they are paused (72). However, once the last unpaused flow of latency-sensitive data is paused or terminated, the link transitions back to state 60 (74).

Although FIG. 4 illustrates an embodiment in which only one level of pause is recognized for the link, the same principles described herein could be used to practice embodiments in which multiple pause levels, and multiple MATUs, are used. In such embodiments, for example, a different state could be assigned to each level of fragmentation, and the state of the system (i.e., the level of fragmentation that was chosen) would simply depend on the most latency-sensitive voice flow that was active. For example, if one flow comprises voice data with a short pause, and another flow comprises voice data with a longer pause, the MATU corresponding to the voice flow with the short pause is selected, and incoming packets are fragmented accordingly. If the voice flow with the short pause terminates, and the voice flow with the long pause continues, then the state of the link transitions such that the MATU, or level of fragmentation, corresponding to the voice flow with the long pause is selected. Thus, systems with more than two levels of fragmentation are readily implemented in accordance with the principles of the present invention.

Figure 5A:
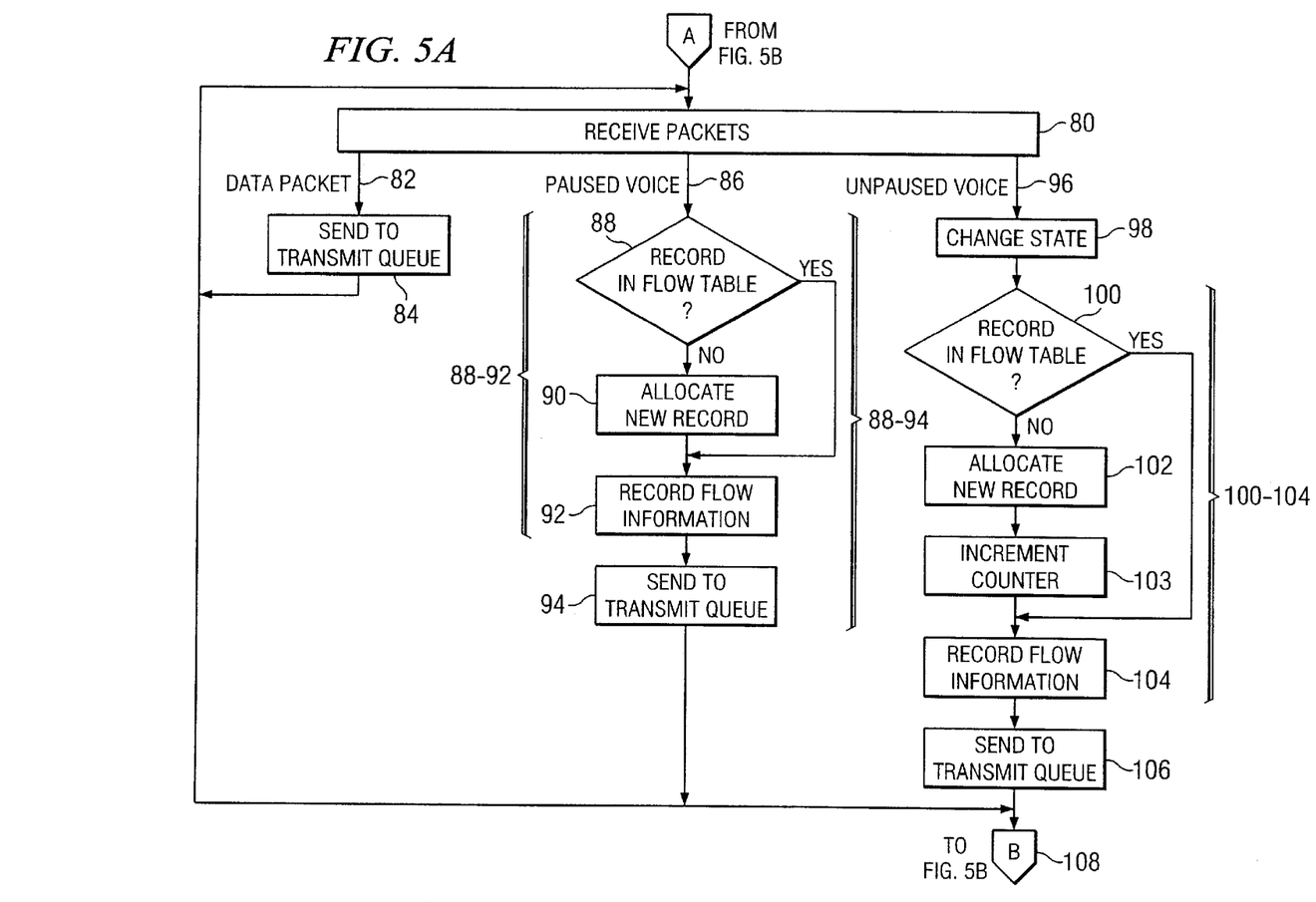
FIGS. 5A and 5B are illustrations of the packet-handling operation of a linking device in one embodiment of the present invention.
Figure 5B:
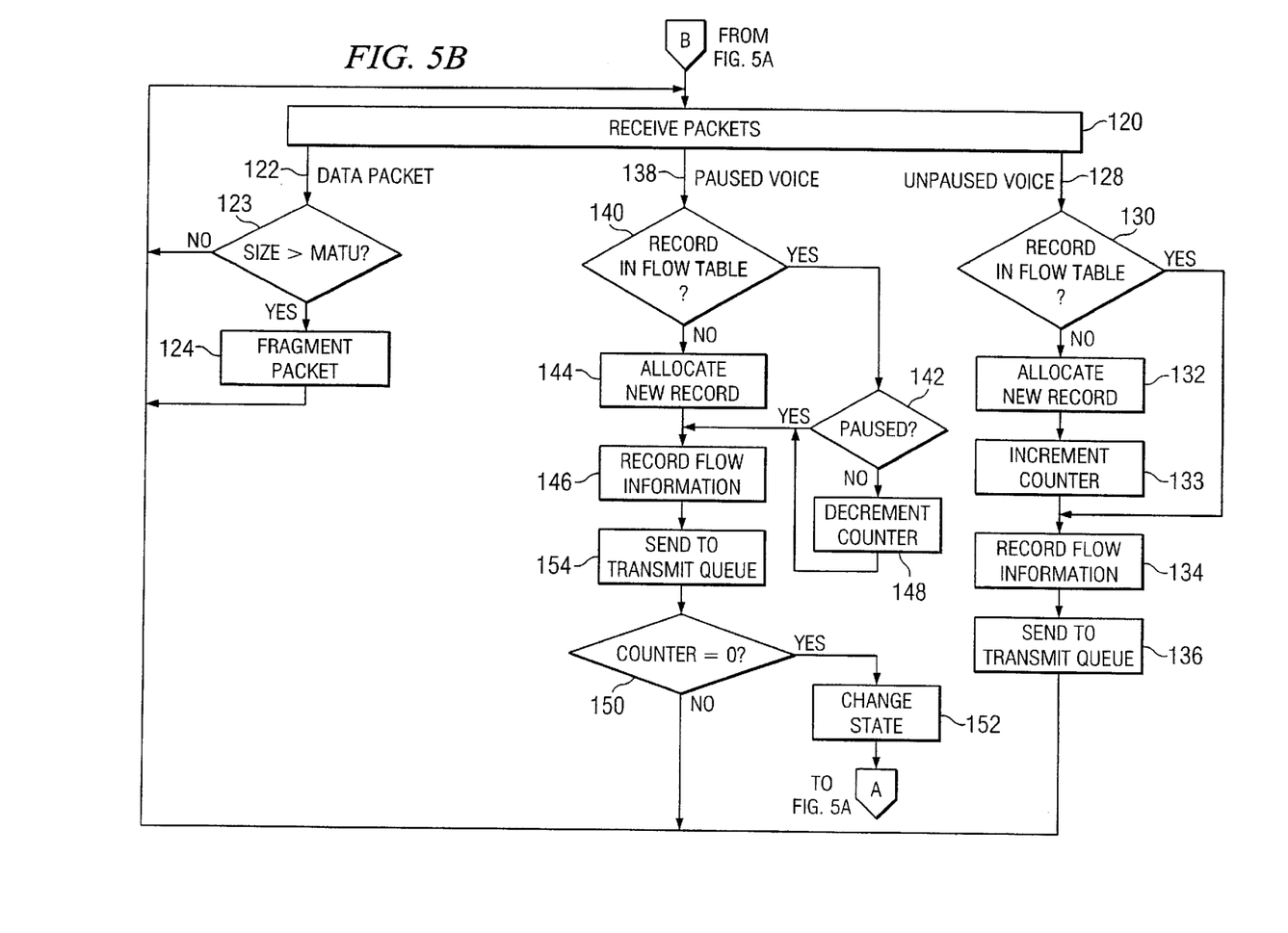

FIGS. 5A and 5B are more detailed illustrations of the packet-handling operation of linking device 14 in the embodiment described above in conjunction with FIG. 4. As described above, the default state of the link is one in which incoming packets are not fragmented (or more precisely, one in which packets are only fragmented if they exceed the default MATU of the network). With reference to FIG. 5A, in this state linking device 14 receives and monitors incoming packets (80). If a data packet is received (82), linking device 14 simply places the packet in the transmit queue 326 for subsequent transmission (84). After placing the packet in queue 326, linking device 14 returns to monitoring incoming packets.

If, however, linking device 14 receives a packet containing paused voice data (86), linking device 14 records information regarding this voice flow in flow table 354, preferably either by creating a new record for this flow or by updating an existing record (88–92). Next, linking device 14 places the packet in the transmit queue, preferably at or near the front, and returns to monitoring incoming packets. It will be appreciated that in some embodiments linking device 14 may continue monitoring incoming packets at the same time it is performing other steps, such as steps 88–94.

Referring once again to FIG. 5A, if linking device 14 receives a voice packet without a pause indicator (96) the state of the link changes to one in which data packets above a certain size are fragmented (98). Linking device 14 updates flow table 354 (100–104), creating a new entry if necessary. Moreover, in order to keep track of the state of the link, processor 322 may also store a state indicator in memory 324, indicating the current state and its associated MATU. Linking device 14 may also keep track of the number of active, unpaused voice flows by maintaining a counter such as counter 362. If such a counter is used, it is set equal to one at this point, indicating that there is one active, unpaused voice flow (105). Once the flow information is recorded, the voice packet is placed in the transmit queue (106), preferably at or near the front, and linking device 14 returns to monitoring incoming packets in the new state (108).

Referring now to FIG. 5B, the operation of linking device 14 following the receipt of an unpaused voice packet is shown. Linking device 14 monitors incoming packets (120). If an ordinary data packet is received (122), and the packet is larger than the MATU for the current state—i.e., the MATU when unpaused voice data is being transmitted across the link—linking device 14 fragments the packet appropriately (124), forwards the packet, and returns to monitoring incoming packets (120). If the size of the packet is less than or equal to the MATU for this state, then the packet is forwarded without fragmentation.

It should be noted that, preferably, the packet size is tested and the fragmentation decision is made as the packet leaves the transmission queue and not as the packet enters the transmission queue. That is because the state of the link may change while the packet is in the transmission queue. In some embodiments, packets are fragmented (or not) before entering the transmission queue, although that approach may cause some inappropriate fragmentation decisions just before the link state changes, since packets will exist in the queue that were fragmented according to the state of the link before the change. Similarly, if linking device 14 receives a packet containing voice data without a pause (128), linking device 14 records this information in flow table 354, incrementing counter 362 if appropriate (i.e., if this packet is from a new flow of voice data). Once the flow information is recorded, the voice packet is placed in the transmit queue (136) (fragmented if necessary), and linking device 14 returns to monitoring incoming packets (120). In one embodiment, new voice packets are preferably queued in front of ordinary data packets but behind previously queued voice packets. However, in another embodiment, a prioritization scheme is applied, and packets are placed in the queue according to their priority. In this embodiment, even ordinary data packets accumulate priority the longer they stay in the queue. Other suitable queuing methods may be used in accordance with the principles of the present invention.

With reference to FIG. 5B, if linking device 14 receives a voice packet with a pause indicator (138), linking device 14 checks to see if flow table 354 contains a record for that voice flow (140). If a record is not found, linking device 14 allocates a new record (144), increments or sets a counter, and records the flow information in flow table 354 (146). If a record already exists, then the linking device 14 preferably checks the record to determine whether the flow was already paused (142). If the flow was already paused, linking device 14 simply updates the flow information in flow table 354 (146). However, if the flow was not previously paused, linking device 14 also decrements a counter which keeps trace of the number of unpaused voice flows being handled for the link by linking device 14 (148). If there are no more unpaused voice flows (150)—i.e., if the counter is equal to zero—the link transitions back to the default state in which incoming packets are not fragmented and there is a change state condition (152). Linking device 14 then places the voice packet in the transmit queue (154), preferably at or near the front, and returns to monitoring incoming packets, either in state 120 if there were additional unpaused voice flows, or in state 80 if there were not.

FIGS. 5A and 5B illustrate a method of processing packets for a link according to one embodiment of the present invention. Some of the steps shown in FIGS. 5A and 5B can be omitted, combined with other steps, or performed in a different order without departing from the principles of the present invention. For example, steps 142 and 148 may be performed after step 146, rather than before it, as shown in FIG. 5B. As another example, counter 362 can be eliminated, and the information regarding the number of active voice channels can be determined by scanning the flow table 324 at step 150. Thus, it should be understood that numerous variations can be made to FIGS. 5A and 5B without departing from the principles of the present invention.

Monitoring packets and changing the state of a link depending on whether nonpaused voice data, paused voice data, or no voice data has been described. In an alternate embodiment, the state of a link is determined by detecting voice signaling (H.323 over TCP/IP, or SIP over UDP). State changes would then occur at the granularity of calls (rather than pauses within voice flows), but would still be useful in many systems. For example, a small remote office may use a network line for both voice and data. When the one or two office phones are being used, all data is fragmented. When both phones are not being used, data is not fragmented. The implementation may be simplified if only the relatively low bandwidth voice signaling is monitored by the linking device instead of the much higher bandwidth voice packets.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for processing packets in a network, comprising:
    a linking device operable to receive a plurality of flows of packets from a plurality of sources, wherein the linking device includes:
        a fragmenter operable to fragment packets in the selected flow exceeding a maximum allowed transferable unit (MATU) size;
        a transmitter operable to transmit one or more of the flows of packets to one or more destinations;
        a detector operable to detect a pause in a signal embodied in a selected flow of packets;
        a processor operable to cause a modification to the manner in which packets in the selected flow are transmitted if the detector detects a pause in the signal embodied in the selected flow of packets.

2. The system of claim 1, wherein the signal embodied in the particular flow of packets is a selected one of a group consisting of:
    a voice signal;
    a video signal; and
    an audio-visual data signal.

3. The system of claim 1, wherein the network is a selected one of a group consisting of:
    an internet protocol (IP) network;
    an asynchronous transfer mode (ATM) network; and
    a frame relay network.

4. The system of claim 1, wherein the selected flow of packets is a flow of user datagram protocol (UDP) IP packets.

5. The system of claim 1, wherein the packets are IP packets.

6. The system of claim 1, wherein the packets are ATM packets.

7. The system of claim 1, wherein the packets are frame relay packets.

8. The system of claim 1, wherein the detector is operable to detect a pause in the signal embodied in the selected flow of packets by using information in a header of a packet in the selected flow of packets.

9. The system of claim 1, wherein the linking device is operable to monitor one or more connections coupled to the linking device and to facilitate communication of one or more of the flows.

10. A system for processing packets in a network, comprising:
    a linking device operable to receive a plurality of flows of packets from a plurality of sources, wherein the linking device includes:
        a transmitter operable to transmit one or more of the flows of packets to one or more destinations;
        a detector operable to detect a pause in a signal embodied in a selected flow of packets;
        a processor operable to cause a modification to the manner in which packets in the selected flow are transmitted if the detector detects a pause in the signal embodied in the selected flow of packets; and
        a fragmenter operable to fragment packets in the selected flow exceeding a maximum allowed transferable unit (MATU) size;
    wherein the modification to the manner in which the packets are transmitted comprises increasing the MATU size by a predefined amount.

11. A system for processing packets in a network, comprising:
    a linking device operable to receive a plurality of flows of packets from a plurality of sources, wherein the linking device includes:
        a transmitter operable to transmit one or more of the flows of packets to one or more destinations;
        a detector operable to detect a pause in a signal embodied in a selected flow of packets;
        a processor operable to cause a modification to the manner in which packets in the selected flow are transmitted if the detector detects a pause in the signal embodied in the selected flow of packets; and
        a fragmenter operable to fragment packets in the selected flow exceeding a maximum allowed transferable unit (MATU) size;

wherein the detector is operable to detect a pause in the signal embodied in the selected flow of packets by using information in a header of a packet in the selected flow of packets;

wherein the particular flow of packets comprises UDP packets, and wherein the header is a real-time protocol (RTP) header.

12. A system for processing packets in a network, comprising:

a linking device operable to receive a plurality of flows of packets from a plurality of sources, wherein the linking device includes:

a transmitter operable to transmit one or more of the flows of packets to one or more destinations;

a detector operable to detect a pause in a signal embodied in a selected flow of packets;

a processor operable to cause a modification to the manner in which packets in the selected flow are transmitted if the detector detects a pause in the signal embodied in the selected flow of packets; and a fragmenter operable to fragment packets in the selected flow exceeding a maximum allowed transferable unit (MATU) size;

wherein the detector is operable to detect a pause in the signal embodied in the selected flow of packets by comparing an amount of time since the linking device last received a packet in the selected flow of packets to a predefined amount of time.

13. A method of transmitting a flow of data over a network, comprising:

packaging the flow of data into a plurality of packets;

detecting a pause in the flow of data; and recording a marker indicative of the pause in a packet, wherein the marker is operable to cause a downstream link to increase the size of a maximum allowed transferable unit (MATU) for the link.

14. The method of claim 13, wherein the data is a selected one of a group consisting of:

voice data;

video data; and audio-visual data.

15. The method of claim 13, further comprising determining whether the pause is associated with a selected one of a group consisting of:

an inter-word pause;

an inter-sentence pause; and a pause longer than both the inter-word and inter-sentence pauses.

16. The method of claim 15, wherein the marker is operable to identify the type of pause.

17. The method of claim 16, wherein the inter-word pause has a duration greater than a first predefined threshold but less than a second predefined threshold, and wherein the inter-sentence pause of the second type has a duration greater than or equal to the second predefined threshold.

18. The method of claim 13, wherein the plurality of packets comprise user datagram protocol (UDP) packets.

19. The method of claim 18, wherein the UDP packets include a real-time protocol (RTP) header, and wherein the marker comprises one or more bits in the RTP header.

20. A method for processing packets in a network, comprising:

receiving a plurality of flows of packets from a plurality of sources;

fragmenting packets in the selected flow exceeding a maximum allowed transferable unit (MATU) size;

transmitting the plurality of flows of packets to one or more destinations;

detecting a pause in a signal embodied in a selected flow of packets;

modifying the manner in which packets are transmitted upon detection of a pause in the signal embodied in the selected flow of packets.

21. The method of claim 20, wherein the signal is a selected one of a group consisting of:

a voice signal;

a video signal; and an audio-visual signal.

22. The method of claim 20, wherein the network is a selected one of a group consisting of:

an internet protocol (IP) network;

an asynchronous transfer mode (ATM) network; and a frame relay network.

23. The method of claim 20, wherein the signal is embodied in a flow of user datagram protocol (UDP) IP packets.

24. The method of claim 20, wherein detecting the pause in the signal embodied in the selected flow of packets includes using information in a header of a packet in the selected flow of packets.

25. A method for processing packets in a network, comprising:

receiving a plurality of flows of packets from a plurality of sources;

transmitting the plurality of flows of packets to one or more destinations;

detecting a pause in a signal embodied in a selected flow of packets;

modifying the manner in which packets are transmitted upon detection of a pause in the signal embodied in the selected flow of packets; and fragmenting packets in the selected flow exceeding a maximum allowed transferable unit (MATU) size);

wherein modifying the manner in which packets are transmitted includes increasing the MATU size.

26. A method for processing packets in a network, comprising:

receiving a plurality of flows of packets from a plurality of sources;

transmitting the plurality of flows of packets to one or more destinations;

detecting a pause in a signal embodied in a selected flow of packets;

modifying the manner in which packets are transmitted upon detection of a pause in the signal embodied in the selected flow of packets; and fragmenting packets in the selected flow exceeding a maximum allowed transferable unit (MATU) size;)

determining whether the pause is associated with a selected one of a group consisting of:

an inter-word pause;

an inter-sentence pause; and a pause longer than both the inter-word and inter-sentence pauses.

27. The method of claim 26, wherein the inter-word pause has a duration greater than a first predefined threshold but less than a second predefined threshold, and wherein the inter-sentence pause of the second type has a duration greater than or equal to the second predefined threshold.

28. The method of claim 27, wherein modifying the manner in which packets are transmitted includes increasing the MATU size by a first amount if the pause is of the inter-word type and increasing the MATU size by a second amount if the pause is of the inter-sentence type, and wherein the second amount is greater than the first amount.

29. A method for processing packets in a network, comprising:
  receiving a plurality of flows of packets from a plurality of sources;
  transmitting the plurality of flows of packets to one or more destinations;
  detecting a pause in a signal embodied in a selected flow of packets;
  modifying the manner in which packets are transmitted upon detection of a pause in the signal embodied in the selected flow of packets; and
  fragmenting packets in the selected flow exceeding a maximum allowed transferable unit (MATU) size;
  wherein detecting the pause in the signal embodied in the selected flow of packets includes using information in a header of a packet in the selected flow of packets;
  wherein the selected flow of packets comprises UDP packets, and wherein the header is a real-time protocol (RTP) header.

30. A method for processing packets in a network, comprising:
  receiving a plurality of flows of packets from a plurality of sources;
  transmitting the plurality of flows of packets to one or more destinations;
  of detecting a pause in a signal embodied in a selected flow of packets;
  modifying the manner in which packets are transmitted upon detection of a pause in the signal embodied in the selected flow of packets; and
  fragmenting packets in the selected flow exceeding a maximum allowed transferable unit (MATU) size;
  wherein detecting the pause in the signal embodied in the selected flow of packets comprises comparing a predefined threshold to an amount of time elapsed since last receiving a packet in the selected flow of packets.

31. A method of transmitting a flow of data in a network, comprising:
  receiving a plurality of flows of packets from a plurality of sources;
  packaging selected flows of data into a plurality of packets;
  fragmenting packets within one or more of the plurality of flows exceeding a maximum allowed transferable unit size;
  detecting a pause in a selected one of the flows of data;
  recording a marker indicative of the pause in a packet within the selected flow;
  modifying the manner in which packets are transmitted upon detection of the pause in the selected flow; and
  transmitting one or more of the plurality of flows of packets to one or more destinations.

32. The method of claim 31, wherein the data is a selected one of a group consisting of:
  voice data;
  video data; and
  audio-visual data.

33. A method of transmitting a flow of data in a network, comprising:
  receiving a plurality of flows of packets from a plurality of sources;
  packaging selected flows of data into a plurality of packets;
  detecting a pause in a selected one of the flows of data;
  recording a marker indicative of the pause in a packet within the selected flow;
  modifying the manner in which packets are transmitted upon detection of the pause in the selected flow;
  fragmenting packets within one or more of the plurality of flows exceeding a maximum allowed transferable unit size; and
  transmitting one or more of the plurality of flows of packets to one or more destinations;
  determining whether the pause is associated with a selected one of a group consisting of:
    an inter-word pause;
    an inter-sentence pause; and
    a pause longer than both the inter-word and inter-sentence pauses.

34. The method of claim 33, wherein the inter-word pause comprises a pause of a duration greater than a first predefined threshold but less than a second predefined threshold, and wherein the inter-sentence pause of the second type comprises a pause of a duration greater than or equal to the second predefined threshold but less than a third predefined threshold.

35. The method of claim 34, wherein modifying the manner in which packets are transmitted includes increasing the MATU size by a first amount if the pause is of the inter-word type and increasing the MATU size by a second amount if the pause is of the inter-sentence type, and wherein the second amount is greater than the first amount.

36. A data transmission system for transmitting a flow of data over a network, comprising:
  a processor configured to package a flow of data into a plurality of packets and to detect a pause in the flow of data; and
  a memory configured to record a marker indicative of the pause in a packet, wherein the marker is operable to cause a downstream link to increase the size of a maximum allowed transferable unit (MATU) for the link.

37. The system of claim 36, wherein the data is a selected one of a group consisting of:
  voice data;
  video data; and
  audio-visual data.

38. The system of claim 36, wherein the processor is further configured to determine whether the pause is associated with a selected one of a group consisting of:
  an inter-word pause;
  an inter-sentence pause; and
  a pause longer than both the inter-word and inter-sentence pauses.

39. The system of claim 38, wherein the marker is operable to identify the type of pause.

40. The system of claim 36, wherein the memory is operable to store a flow table that includes data associated with the flow.

41. The system of claim 40, wherein the data associated with the flow includes a selected one or more elements of a group consisting of:
  a flow identifier associated with the flow;

a pause type identifier associated with the flow; and a time-stamp associated with the flow.

42. A computer program product for transmitting a flow of data over a network, the computer program product being embodied in a computer readable medium and comprising computer instructions for:

packaging a flow of data into a plurality of packets;

detecting a pause in the flow of data; and recording a marker indicative of the pause in a packet, wherein the marker is operable to cause a downstream link to increase the size of a maximum allowed transferable unit (MATU) for the link.

43. A computer program product for transmitting and receiving a flow of data over a network, the computer program product being embodied in a computer readable medium and comprising computer instructions for:

receiving a plurality of flows of packets from a plurality of sources;

fragmenting packets in the selected flow exceeding a maximum allowed transferable unit (MATU) size;

transmitting the plurality of flows of packets to one or more destinations;

detecting a pause in a signal embodied in a selected flow of packets;

modifying the manner in which packets are transmitted upon detection of a pause in the signal embodied in the selected flow of packets.

44. A system for transmitting a flow of data over a network, comprising:

means for receiving a plurality of flows of packets from a plurality of sources;

means for packaging selected flows of data into a plurality of packets;

means for fragmenting packets within one or more of the plurality of flows exceeding a maximum allowed transferable unit size;

means for detecting a pause in a selected one of the flows of data;

means for recording a marker indicative of the pause in a packet within the selected flow;

means for modifying the manner in which packets are transmitted upon detection of the pause in the selected flow.

45. A system for transmitting a flow of data over a network, comprising:

means for packaging a flow of data into a plurality of packets;

means for detecting a pause in the flow of data; and means for recording a marker indicative of the pause in a packet, wherein the marker is operable to cause a downstream link to increase the size of a maximum allowed transferable unit (MATU) for the link.

* * * * *